F. F. HAWKINS.

EYELET.

No. 11,500. Reissued June 18, 1895.

Witnesses:
G. H. Curtis
J. W. Caleopy

Inventor:
Frank F. Hawkins
by Mosher & Curtis
Attys.

THE NORRIS PETERS CO., PHOTO-LITHO., WASHINGTON, D. C.

UNITED STATES PATENT OFFICE.

FRANK F. HAWKINS, OF TROY, NEW YORK, ASSIGNOR OF ONE-HALF TO JOHN A. MANNING, OF SAME PLACE.

EYELET.

SPECIFICATION forming part of Reissued Letters Patent No. 11,500, dated June 18, 1895.

Original No. 483,784, dated October 4, 1892. Application for reissue filed September 24, 1894. Serial No. 523,995.

*To all whom it may concern:*

Be it known that I, FRANK F. HAWKINS, of the city of Troy, county of Rensselaer, and State of New York, have invented a new and useful Improvement in Eyelets, of which the following is a specification.

My invention relates to a new form of eyelet for shoes, glove or other lacings, in which the tubular metal part of the eyelet, where in sight on the outer surface of, or within, the material to which it is attached, is combined with and covered or protected by a hard-rubber ring. Where eyelets are made of sheet-metal, such as brass or white metal, the contrast which the color of the metal makes with the material to which they are attached, renders them unsightly, and this is more particularly the case where brass eyelets are used in shoes in connection with lacings; and it is the object of my invention to combine with the tubular metal part of the eyelet, making the attachment, a ring of hard-rubber that covers or protects the interior and exterior of the metal part where such part is in sight, when in use.

Accompanying this specification to form a part thereof, is a sheet of drawings containing four figures drawn on an enlarged scale, illustrating my invention, with the same designation of parts by letter reference used in all the illustrations.

Figure 1:
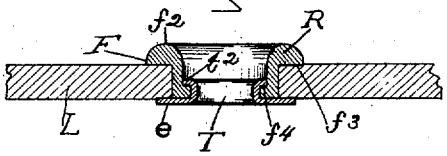
Figure 4:
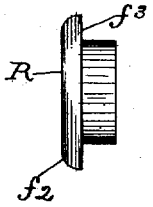
Figure 3:
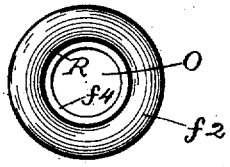
Figure 2:
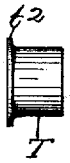

Of these illustrations, Figure 1 is an enlarged section taken diametrically through my improved eyelet and the material to which it is attached. Fig. 2 is a side view of the hard-rubber ring detached. Fig. 3 is a top view of the same. Fig. 4 is a side view of the tubular metal part detached.

The several parts of the eyelet thus illustrated are designated by letter reference, and the functions of the parts are described as follows:

The letter R designates a hard-rubber ring made with a top flange F, said flange having a rounded top edge $f^2$, a flat under edge $f^3$, and an interior flange $f^4$.

The letter T designates the tubular formed metallic part, which is made with a flange $t^2$ on what is its interior end when in place within the rubber part, as shown in Figs. 1 and 4.

The letter L designates the material to which the eyelet is attached in the following manner: A hole having been punched in the material, the hard-rubber ring R is inserted in the hole or so applied that its flange F rests on the top of the material around the hole, whereupon the tubular metallic part T is passed down through the central opening O of the hard-rubber ring, and the material, so that the flange $t^2$ rests upon the interior flange $f^4$ of said ring, in which condition the end $e$ of the metal tube T is spread out by an implement, and then turned up, to clinch on the under side of the material, as shown in Fig. 1.

And thus made and adapted to attach to a shoe or other article, the metal part of the eyelet where usually in sight is covered or protected by the hard-rubber part. If desired the latter may be colored to produce an ornamental effect, and instead of hard-rubber, celluloid may be used, if desired, to produce the same effect in covering or protecting the unsightly metal part.

I am aware that two-part eyelets have been proposed heretofore, in which one part was made of heavy tubular material provided with a ready-formed attaching flange on one end and screw-threads on the other end, the other part being a screw-threaded nut adapted to be screwed onto the threaded end of the flanged part after the threaded end had been inserted through the material to which the eyelet was to be attached, solely for the purpose of securing the two parts together and upon the supporting material; and I do not claim such a form of construction.

The object of my invention is, not only to secure the two parts upon the supporting material and to each other, but to cover and protect a metallic part from such exposure or wear as would render it unsightly, by an inclosing ring of hard-rubber or celluloid which will not be rendered unsightly by use.

The location of the connecting flanges of the rubber part and metal part is not essential provided they are contained within the rubber ring and covered or protected by its outer surface.

Having thus described my invention, what I claim, and desire to secure by Letters Patent, is—

1. The combination with a tubular hard-rubber or celluloid part made with an encircling flange at its outer end and having a flange in its tubular part near the inner end of the latter, of a tubular metallic eyelet part having a flange on its outer end constructed to engage with the interior flange of the hard-rubber part when passed down through the latter and to be clinched on its inner end, substantially in the manner as and for the purposes set forth.

2. An eyelet comprising a hard rubber, or celluloid, ring, and a tubular metallic clinching part inserted in the ring, the metallic part having an end-flange in engagement with an interior flange on the ring, and the ring having a top flange protecting the metallic part where such part is in sight when in use.

In witness whereof I have hereunto set my hand this 19th day of September, 1894.

F. F. HAWKINS.

Witnesses:

FRANK C. CURTIS,

GEO. A. MOSHER.